United States Patent
Suzuki (10) Patent No.: US 12,189,455 B2
(45) Date of Patent: Jan. 7, 2025

(54) SEMICONDUCTOR DEVICE, COMMUNICATION SYSTEM AND PACKET TRANSMISSION METHOD

(71) Applicant: RENESAS ELECTRONICS CORPORATION, Tokyo (JP)

(72) Inventor: Takayuki Suzuki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 142 days.

(21) Appl. No.: 18/052,387

(22) Filed: Nov. 3, 2022

(65) Prior Publication Data
US 2023/0152876 A1    May 18, 2023

(30) Foreign Application Priority Data
Nov. 16, 2021 (JP) .................... 2021-186708

(51) Int. Cl.
*G06F 1/32* (2019.01)
*G06F 1/3234* (2019.01)
*G06F 13/40* (2006.01)

(52) U.S. Cl.
CPC ........ *G06F 1/3253* (2013.01); *G06F 13/4004* (2013.01)

(58) Field of Classification Search
CPC ............................ G06F 1/3253; G06F 13/4004
See application file for complete search history.

(56) References Cited

U.S. PATENT DOCUMENTS

| | | | | |
|---|---|---|---|---|
| 2004/0177197 A1* | 9/2004 | McLeod | ............. | G06F 13/4045 710/300 |
| 2005/0120157 A1* | 6/2005 | Chen | ..................... | G06F 13/385 710/313 |
| 2008/0288708 A1* | 11/2008 | Hsueh | ................... | G06F 13/385 710/313 |
| 2010/0228993 A1* | 9/2010 | Suzuki | ................ | G06F 13/4027 710/63 |
| 2011/0219163 A1* | 9/2011 | Beadnell | ................. | G06F 13/36 710/315 |
| 2012/0110217 A1* | 5/2012 | Christiansen | ......... | G06F 11/349 710/15 |
| 2022/0283624 A1* | 9/2022 | Bajpai | .................... | G06F 1/3253 |

FOREIGN PATENT DOCUMENTS

JP    2011-215855 A    10/2011

* cited by examiner

*Primary Examiner* — Henry Tsai
*Assistant Examiner* — Harry Z Wang
(74) *Attorney, Agent, or Firm* — Rimon P.C.

(57) ABSTRACT

A technique capable of normally transmitting a LPM token from a transceiver to a USB device is provided. A semiconductor device includes: a controller including a first interface circuit in conformity with UTMI+ standards; a converting circuit including a second interface circuit in conformity with the UTMI+ standards and a third interface circuit in conformity with ULPI standards, the second interface circuit converting data transmitted from the first interface circuit and received, and the third interface circuit transmitting the converted data; a first circuit analyzing a packet output from the controller and identifying and holding a packet identifier contained in the packet; and a second circuit providing a transmission command, after which a data string containing the packet identifier indicating LPM bringing a USB device to a low power consumption state is added, if the first circuit determines that the packet identifier is the LPM.

10 Claims, 7 Drawing Sheets

SEMICONDUCTOR DEVICE, COMMUNICATION SYSTEM AND PACKET TRANSMISSION METHOD

CROSS-REFERENCE TO RELATED APPLICATION

The disclosure of Japanese Patent Application No. 2021-186708 filed on Nov. 16, 2021, including the specification, drawings and abstract is incorporated herein by reference in its entirety.

BACKGROUND

The present invention relates to a semiconductor device, and is applicable to, for example, a semiconductor device including a controller (also referred to as USB controller) making control of communication based on a universal serial bus (USB).

Standards of USB 2.0 (Universal Serial Bus 2.0) do not define an interface between a USB controller (logical-layer circuit) and a transceiver (physical-layer circuit). However, UTMI+ (USB 2.0 Transceiver Macrocell Interface) and ULPI (UTMI+ Low Pin Interface) are practical standards. The ULPI is the interface having the number of wirings that is smaller than the number of wirings of the UTMI+.

And, the standards of the USB 2.0 include protocol standards of a low power consumption mode that is called LPM (Link Power Management). The standards define the shift to the low power consumption mode using a packet for the LPM. The packet for the LPM is a means for a request of the shift from a regular active state to a low power consumption state. The packet for the LPM is also called LPM token. A host and a device shift from the active state to the low power consumption state by transmission/reception of the LPM token and a response packet in response to the token. When the LPM token is transmitted from the host (USB controller) of the USB to the device (connection device) of the USB and then is acknowledged (an ACK signal is replied), the device of the USB and the host of the USB shift to the low power consumption state There is disclosed techniques listed below.
 [Patent Document 1] Japanese Unexamined Patent Application Publication No. 2011-215855

SUMMARY

When the USB controller includes an interface circuit in conformity with the UMTI+ standards while the transceiver includes an interface circuit in conformity with the ULPI standards, an interface converting circuit is arranged between the USB controller and the transceiver. In this case, the USB controller transmits the LPM token to the transceiver, the transceiver cannot normally transmit the LPM token to the USB device.

Other objects and novel characteristics will be apparent from the description of the present specification and the accompanying drawings.

A typical summary of the present invention is briefly described below. That is, a semiconductor device includes: a controller including a first interface circuit in conformity with UTMI+ standards; a converting circuit including a second interface circuit in conformity with the UTMI+ standards and a third interface circuit in conformity with ULPI standards, the second interface circuit converting data transmitted from the first interface circuit and received, and the third interface circuit transmitting the converted data; a first circuit analyzing a packet output from the controller and identifying and holding a packet identifier contained in the packet; and a second circuit providing a transmission command, after which a data string containing the packet identifier indicating LPM bringing a USB device to a low power consumption state is added, if the first circuit determines that the packet identifier is the LPM.

According to the semiconductor device, a transceiver can normally transmit an LPM token to a USB device.

DETAILED DESCRIPTION

Hereinafter, embodiments and comparative examples will be explained with reference to the accompanying drawings. Note that the same components are denoted by the same reference signs in the following explanation, and the repetitive description thereof may be omitted.

Figure 1:
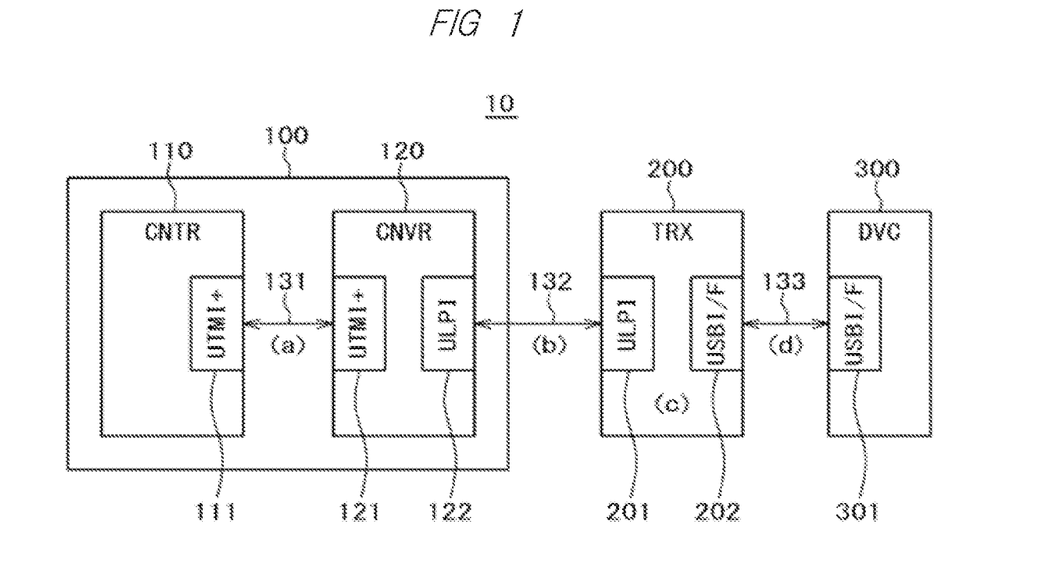
FIG. 1 is a block diagram showing a USB system in a comparative example.

First, in order to make the present embodiment definite, a configuration of a USB system in a comparative example will be explained with reference to FIG. 1. FIG. 1 is a block diagram showing the USB system in the comparative example.

A USB system 10 is made of a controller (CNTR) 110 serving as a USB controller, a converting circuit (CNVR) 120 of interface, a transceiver (TRX) 200, and a device (DVC) 300 serving as a USB device. The controller 110 and the converting circuit 120 are mounted on (embedded in) the semiconductor device 100 such as a FPGA (Field Programmable Gate Array) or a microcontroller, and the transceiver 200 is externally attached to the semiconductor device 100.

The controller 110 includes an interface circuit (referred to as a UMTI+ circuit or a first interface circuit below) 111 in conformity with the UTMI+ standards. The converting circuit 120 includes a UTMI+ circuit 121 serving as a second interface circuit and an interface circuit (referred to as a ULPI circuit or a third interface circuit below) 122 in conformity with the ULPI standards. The transceiver 200 includes a ULPI 201 and an interface circuit (USBI/F) 202 in conformity with the USB standards. The device 300 includes a USBI/F 301. The controller 110 and the converting circuit 120 are connected by a bus 131 in conformity with the UTMI+ standards, the converting circuit 120 and the transceiver 200 are connected by a bus 132 in conformity with the ULPI standards, and the transceiver 200 and the device 300 of the USB are connected by a bus 133 in conformity with the USB standards.

Figure 3:
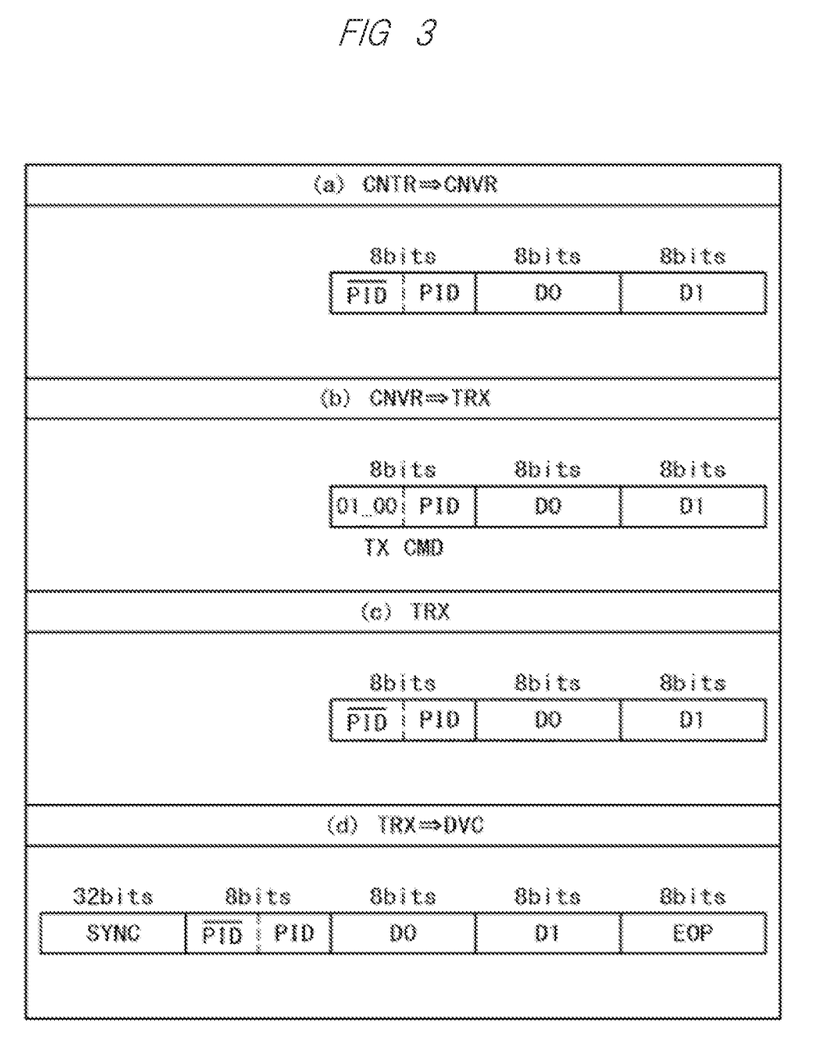
FIG. 3 is a diagram showing packet data.

A summary of packet transmission of the USB 2.0 adopting the ULPI standards will be explained with reference to FIG. 3. FIG. 3 is a diagram showing packet data.

(a) The controller 110 creates a data string (D0, D1) beginning with PID (packet identifier). "/PID" and "PID" shown in FIG. 3 have a 4-bit length. The "/PID" is invert data of the "PID". In the drawing, the "/PID" is illustrated as "PID" with "/" thereon. Each of the D0 and the D1 of the data has an 8-bit length. The controller 110 transmits the created packet data to the converting circuit 120 through the bus 131.

(b) The converting circuit (CNVR) 120 creates a transmission command (TX CMD). In other words, the converting circuit 120 replaces 1 byte (/PID+PID) of beginning of the data transmitted from the controller 110 and received, with the TX CMD (01_00b+PID). A term "b" of "01_00b" means that its previous numeric character is binary number. The converting circuit 120 transmits the converted packet data to the transceiver 200 through the bus 132.

(c) The transceiver 200 performs reverse resolution to the transmission command (01_00b+PID), and restores the data created by the controller 110.

(d) The transceiver 200 performs data conversion in accordance with the USB 2.0 standards. Then, the transceiver 200 transmits the created packet data to the device 300 through the bus 133.

Figure 4:
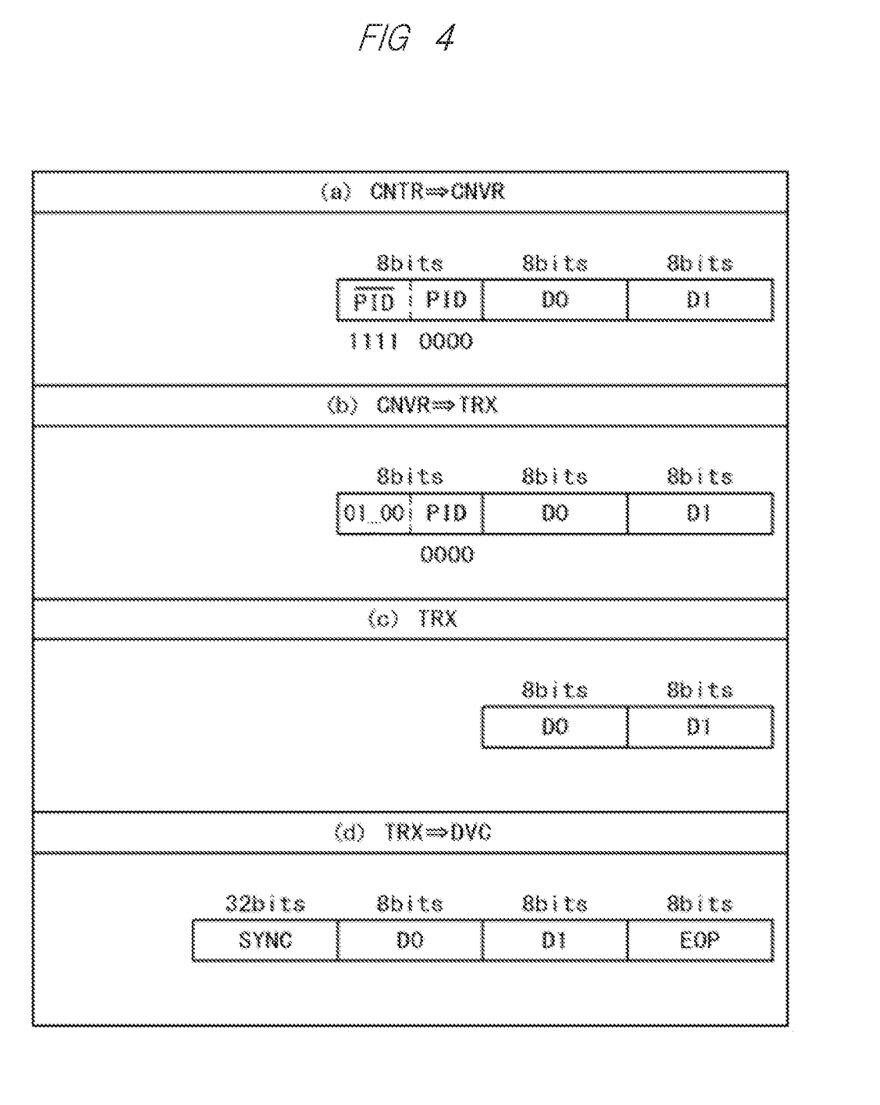
FIG. 4 is a diagram showing packet data in a case in which the USB system shown in FIG. 1 transmits a LPM token.

Regularly, when the LPM token is transmitted, the transceiver 200 cannot normally transmit it because of the following operation. This point will be explained with reference to FIG. 4. FIG. 4 is a diagram showing packet data in a case in which the USB system shown in FIG. 1 transmits the LPM token.

(a) The controller 110 creates the LPM token (PID=0000b). Then, the controller 110 transmits the created packet data to the converting circuit 120 through the bus 131.

(b) The converting circuit 120 creates "01_00b+0000b" as the transmission command. Then, the converting circuit 120 transmits the created packet data to the transceiver 200 through the bus 132.

(c) The data transmissions in conformity with the ULPI standards include a "mode with the PID transmission" and a "mode without the PID transmission", and are determined by a PID value contained in the transmission command. In the case of "PID=0000b", the data transmission is in the "mode without the PID transmission" (ULPI standards operation). Therefore, the data restored by the transceiver 200 is a data string "without the PID".

(d) The transceiver 200 performs data conversion in accordance with the USB 2.0 standards. Then, the transceiver 200 transmits the created packet data to the device 300 through the bus 133.

However, since the invalid packet that is not the LPM token is transmitted from the transceiver 200, the device 300 is not allowed to shift to the lower power consumption mode based on the LPM.

Figure 2:
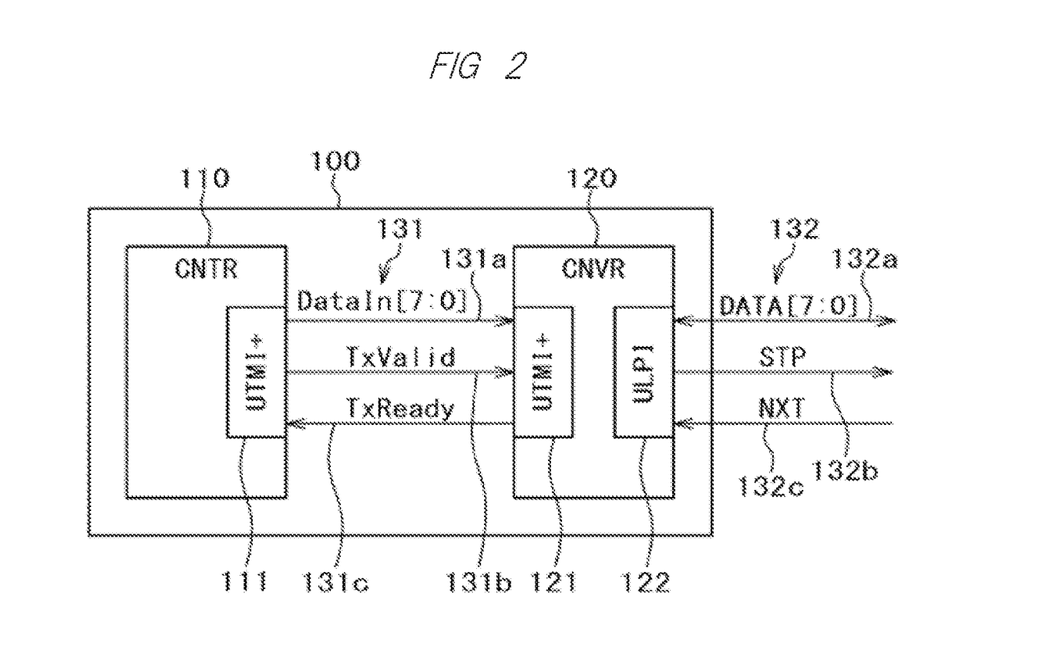
FIG. 2 is a block diagram showing details of a bus in conformity with UTMI+ standards and a bus in conformity with ULPI standards shown in FIG. 1.
Figure 5:
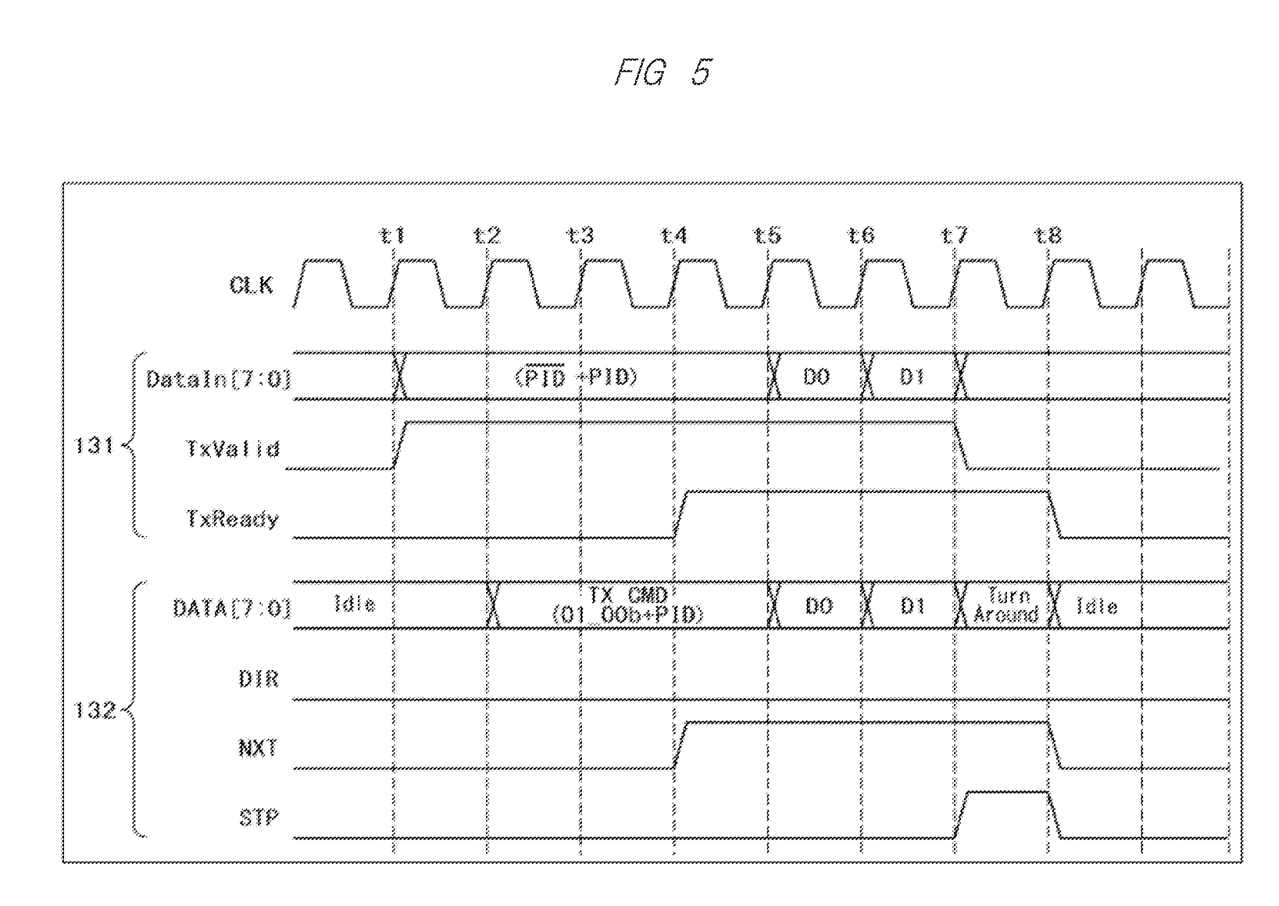
FIG. 5 is a timing chart showing operations of a controller and a converting circuit shown in FIG. 2.

Details of the packet transmission will be explained with reference to FIGS. 2 and 5. FIG. 2 is a block diagram showing details of the bus in conformity with the UTMI+ standards and the bus in conformity with the ULPI standards. FIG. 5 is a timing chart showing operations of the controller and the converting circuit shown in FIG. 2.

As shown in FIG. 4, the bus 131 includes a data bus 131a, a signal line 131b and a signal line 131c. In the data bus 131a, 8-bit length data (DataIn [7:0]) is input from the controller 110 to the converting circuit 120. In the signal line 131b, a data valid signal (TxValid) indicating that the data on the data bus 131a is valid is input from the controller 110 to the converting circuit 120. In the signal line 131c, a transmission enable signal (TxReady) indicating that the converting circuit 120 is allowed to receive the data is input from the converting circuit 120 to the controller 110.

The bus 132 includes a data bus 132a, a signal line 132b and a signal line 132c. In the data bus 132a, 8-bit length data (Data [7:0]) is exchanged between the converting circuit 120 and the transceiver 200. In the signal line 132b, a signal (STP) indicating the last byte of the packet data is input from the converting circuit 120 to the transceiver 200. In the signal line 132c, a transmission request signal (NXT) indicating that the transceiver 200 has received the data is input from the transceiver 200 to the converting circuit 120.

At a timing t1, the controller 110 outputs "/PID+PID" as the DataIn [7:0], and asserts the data valid signal (TxValid). In this case, each of timing t1 to t8 is a rising edge of a cock signal (CLK).

At a timing t2, the converting circuit 120 replaces "/PID+PID" being the DataIn [7:0] transmitted from the controller 110 and received, with a transmission command "01_00b+PID". Then, the converting circuit 120 transmits the created transmission command as the DATA [7:0] to the transceiver 200.

After receiving the transmission command being the DATA [7:0], the transceiver 200 asserts the transmission request signal (NXT) at a timing t4, and transmits it to the converting circuit 120. The converting circuit 120 asserts the received transmission request signal (NXT) as the transmission enable signal (TxReady), and transmits it to the controller 110. In this case, at each of timing t4 to t7, the DataIn [7:0] and the Data [7:0] are valid.

At a timing t5, the controller 110 outputs "D0" as the DataIn [7:0] in response to the asserted transmission enable signal (TxReady). The converting circuit 120 transmits "D0" being the DataIn [7:0] transmitted from the controller 110 and received, as the Data [7:0] to the transceiver 200.

At a timing t6, "D1" is output as the DataIn [7:0]. The converting circuit (CNVR) 120 transmits "D1" being the DataIn [7:0] transmitted from the controller 110 and received, as DATA [7:0] to the transceiver 200.

At a timing t7, the controller 110 negates the data valid signal (TxValid). The converting circuit 120 asserts the signal (STP) on the basis of the negated data valid signal (TxValid) transmitted from the controller 110 and received, and transmits it to the transceiver 200.

At a timing t8, the transceiver 200 negates the transmission request signal (NXT) on the basis of the asserted signal (STP).

Note that the DIR shown in FIG. 5 but not shown in FIG. 4 is a signal indicating a transmission/reception direction of the 8-bit length data (DATA [7:0]), and is negated when being transmitted from the converting circuit 120 to the transceiver 200 or is asserted when being transmitted from the transceiver 200 to the converting circuit 120. In FIG. 5, the DIR is negated.

Figure 6:
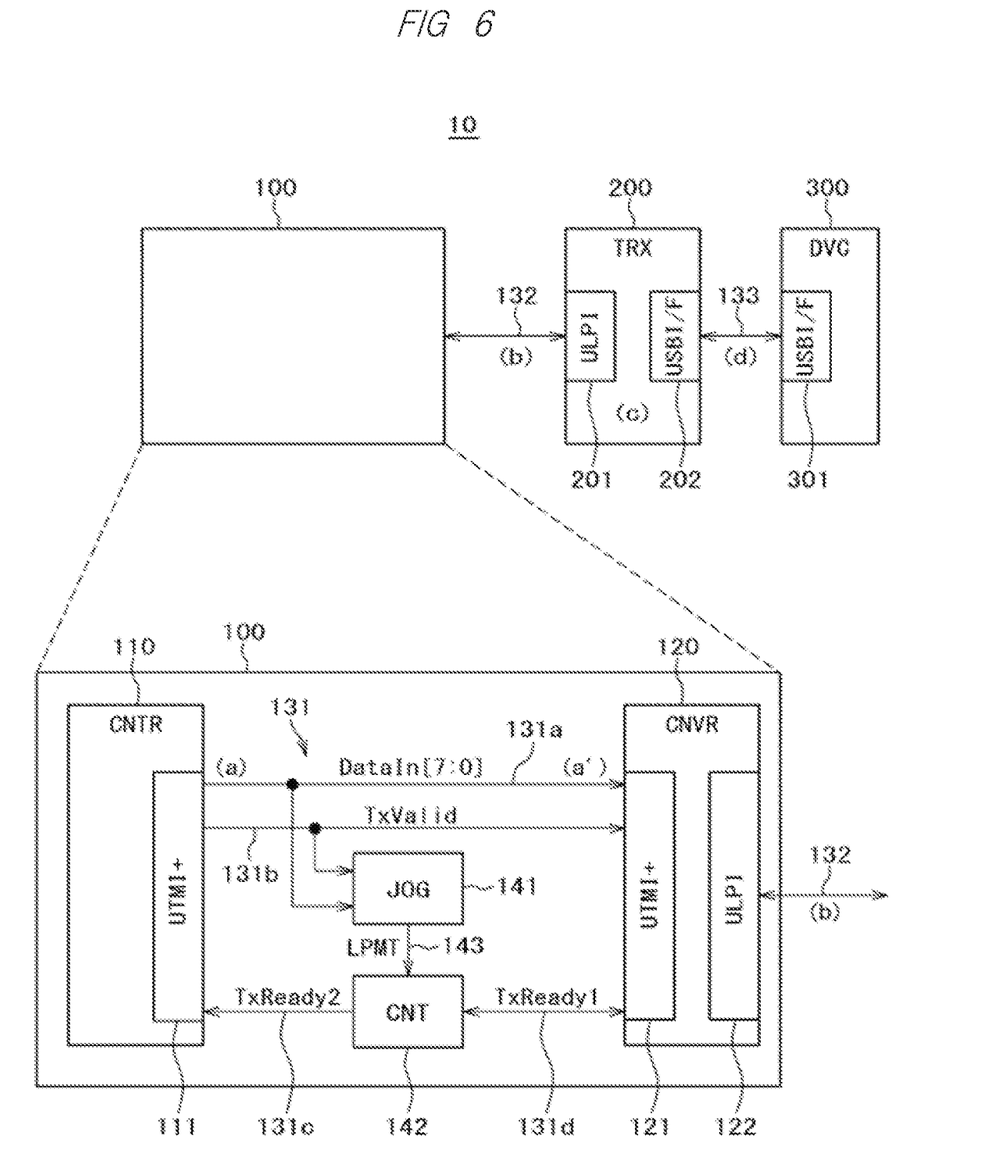
FIG. 6 is a block diagram showing a USB system in an embodiment.

If the transmission command is "01_00b+0000b" as described above, the transceiver 200 converts the packet data to the data without the transmission command. Therefore, "/PID+PID" is not transmitted to the device 300. Next, a configuration of the USB system in the embodiment will be explained with reference to FIG. 6. FIG. 6 is a block diagram showing the USB system in the embodiment.

The USB system 10 in the embodiment is made of a controller (CNTR) 110 of the USB, a converting circuit (CNVR) 120 of the interface, a transceiver 200 and a device (DVC) of the USB 300 as similar to the USB system in the comparative example. However, a bus 131 connecting the controller 110 and the converting circuit 120 is provided with a judging circuit (JDG) 141 serving as a first circuit and a control circuit (CNT) 142 serving as a second circuit.

The judging circuit 141 is connected to a data bus 131*a* to which the DataIn [7:0] of the bus 131 is transmitted and a signal line 131*b* to which a data valid signal (TxValid) is transmitted. The judging circuit 141 identifies and holds the PID of the packet data transmitted from the controller 110. In other words, the judging circuit 141 judges whether the PID is the LPM token. The judging circuit 141 outputs a judgement result (LPMT) to a signal line 143.

The control circuit 142 is connected to a signal line 131*d* to which a first transmission enable signal (TxReady1) is transmitted, a signal line 131*c* to which a second transmission enable signal (TxReady2) is transmitted, and the signal line 143 to which the judgement result (LPMT) is transmitted. The control circuit 142 controls the transmission of the second transmission enable signal (TxReady2) from the converting circuit 120 to the controller 110 in accordance with the PID.

Figure 7:
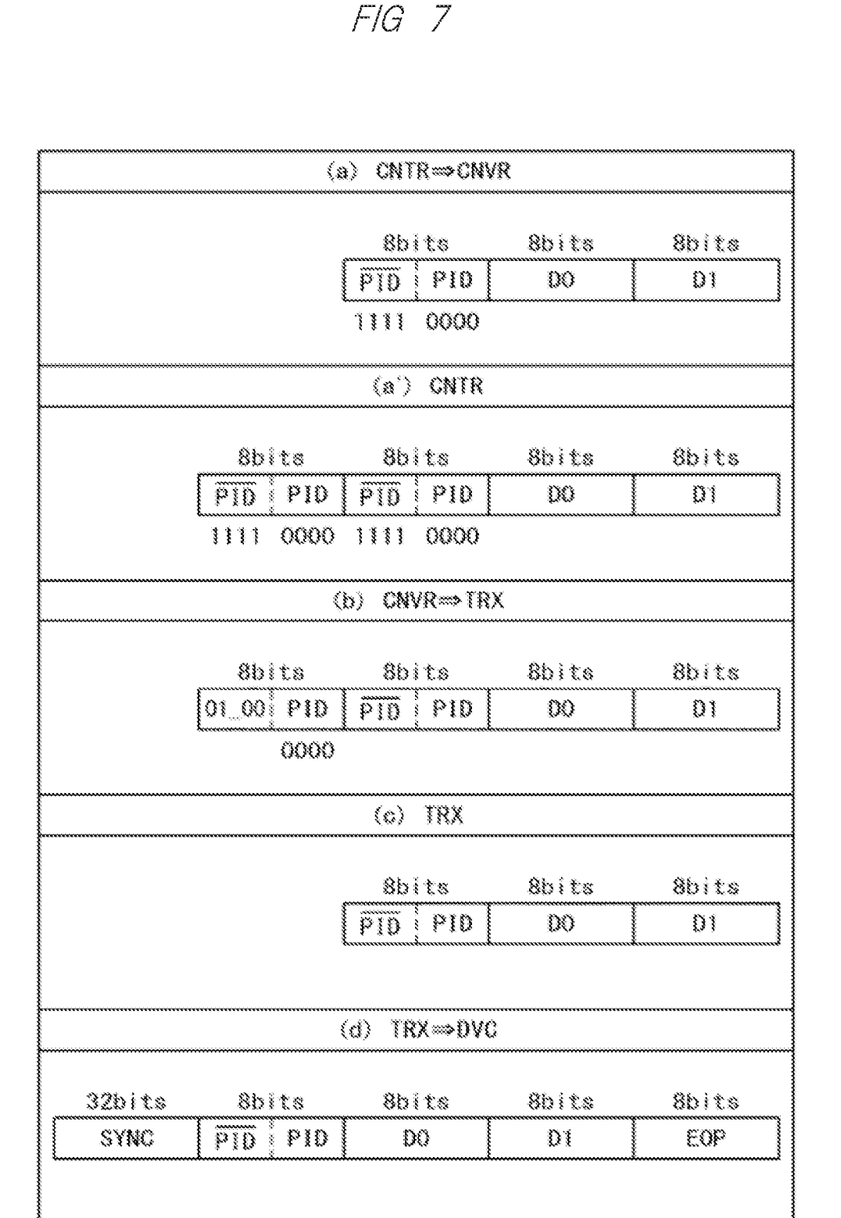
FIG. 7 is a diagram showing packet data in a case in which the USB system shown in FIG. 6 transmits a LPM token.

The packet data in the case in which the USB system in the embodiment transmits the LPM token will be explained with reference to FIG. 7. FIG. 7 is a diagram showing the packet data in the case in which the USB system shown in FIG. 6 transmits the LPM token.

(a) The controller 110 creates the LPM token (PID=0000b). Then, the controller 110 of the USB outputs the created packet data to the data bus 131*a*.

(a') The judging circuit 141 judges the PID by the data of 1 byte of the beginning of the DataIn [7:0]. In this case, since the DataIn [7:0]=F0h, the judging circuit 141 determines that the PID is the LPM token, asserts the LPMT, and outputs it to the control circuit 142 through the signal line 143. In this case, a term "h" of "F0h" indicates that its previous alphanumeric character is a hexadecimal number.

The control circuit 142 converts the asserted first transmission enable signal (TxReady1) to be transmitted through the signal line 131*d*, to TxReady2. In other words, the control circuit 142 creates the second enable signal (TxReady2) while masking the first 1 cycle of the asserted first transmission enable signal (TxReady1), and stops masking the asserted cycle of the next first transmission enable signal (TxReady1) and thereafter. The control circuit 142 transmits the second transmission enable signal (TxReady2) to the controller 110 through the signal line 131*d*. As a result, the controller (CNTR) 110 holds the output of "/PID+PID", and outputs 2 bytes of "/PID+PID" to the data bus 131*a*.

If the judging circuit 141 determines that the PID is not the LPM token, note that the control circuit 142 creates the second enable signal (TxReady2) that is the same signal as the first transmission enable signal (TxReady1) while not masking the first transmission enable signal (TxReady1).

(b) The converting circuit 120 creates "01_00b+0000b" as the transmission command from "/PID+PID" of a first byte, and handles "/PID+PID" of a second byte as the data. Then, the converting circuit 120 transmits the created packet data to the transceiver 200 through the bus 132.

(c) As described above, in the case of "PID=0000b", the data transmission adopts the "mode without the PID transmission" (ULPI standards operation), and the "/PID+PID" of the first byte is not transmitted. However, since the "/PID+PID" of the second byte is the data, the packet data restored by the transceiver 200 is of a data string including the "/PID+PID" of the second byte.

(d) The transceiver 200 performs data conversion in conformity with the USB 2.0 standards. Then, the transceiver 200 transmits the created packet data to the device 300 through the bus 133.

If the PID is not the LPM token, the packet data shown in FIG. 2 is transmitted.

Figure 8:
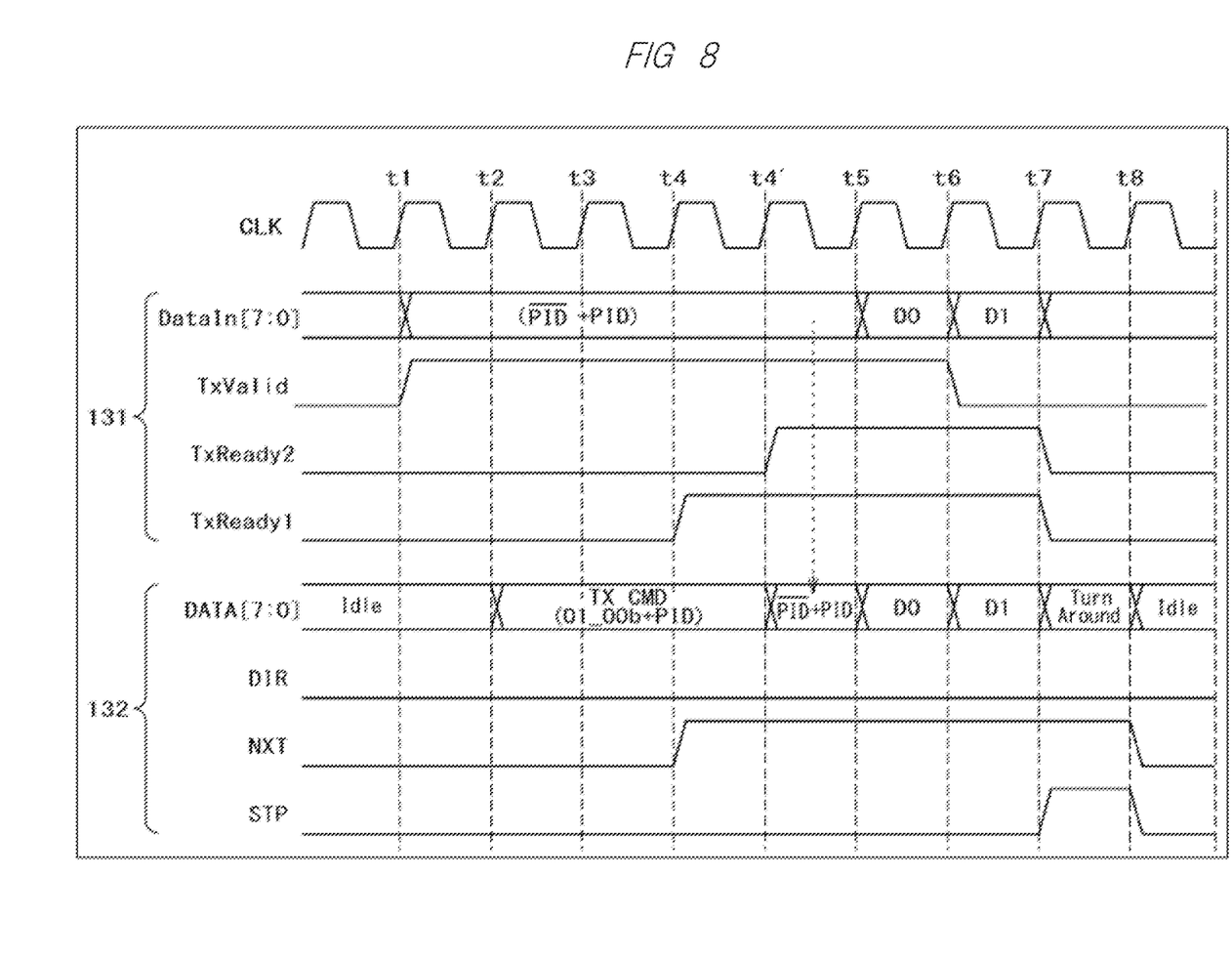
FIG. 8 is a timing chart showing operations of a controller and a converting circuit shown in FIG. 6.

Details of the packet transmission in the case in which the PID is the LPM token will be explained with reference to FIGS. 6 and 8. FIG. 8 is a timing chart indicating operations of the controller and the converting circuit shown in FIG. 6.

Operations at the timings t1 to t3 and t6 to t8 are the same as those of FIG. 5.

The transceiver 200 asserts the transmission request signal (NXT) at the timing t4 after receiving the transmission command of the DATA [7:0], and outputs it to the converting circuit 120. The converting circuit 120 asserts the received transmission request signal (NXT) as the first transmission enable signal (TxReady1), and outputs it to the control circuit 142. The control circuit 142 creates the second transmission enable signal (TxReady2) while masking the first 1 cycle of the asserted first transmission enable signal (TxReady1), and transmits the negated second transmission enable signal (TxReady2) to the controller 110 through the signal line 131*d*. In this case, at the timings t4 to t7, the DATA [7:0] is valid.

Note that the second transmission enable signal (TxReady2) is negated at the timing t4. Therefore, between the timings t4' and t5, the controller 110 holds the output of the "/PID+PID" as the DataIn [7:0]. In this case, at the timings t4' to t7, the DATAIn [7:0] is valid.

At the timing t4', the control circuit 142 stops masking the asserted first transmission enable signal (TxReady1), and asserts the second transmission enable signal (TxReady2). The control circuit 142 transmits the asserted second transmission enable signal (TxReady2) to the controller 110 through the signal line 131*c*. The converting circuit 120 transmits the "/PID+PID" of the DataIn [7:0] transmitted from the controller 110 and received, as the DATA [7:0] to the transceiver 200.

At the timing t5, the controller 110 outputs "D0" as the DataIn [7:0] in response to the asserted second transmission enable signal (TxReady2). The converting circuit 120 transmits the "D0" of the DataIn [7:0] transmitted from the controller 110 and received, as the DATA [7:0] to transceiver 200.

If the PID is not the LPM token, the packet data is transmitted as similar to the timing shown in FIG. 5.

According to the embodiment, even when the USB controller including the interface circuit in conformity with the UMTI+ standards transmits the LPM token through the converting circuit to the transceiver including the interface circuit in conformity with the ULPI standards, the transceiver can normally transmit the LPM token to the USB device. And, it is unnecessary to change the USB controller and the converting circuit.

In the foregoing, the invention made by the present inventors has been concretely described on the basis of the embodiments. However, it is needless to say that the present invention is not limited to the foregoing embodiment, and various modifications can be made within the scope of the present invention.

What is claimed is:

1. A semiconductor device comprising:
    a controller including a first interface circuit in conformity with UTMI+ standards;
    a converting circuit including a second interface circuit in conformity with the UTMI+ standards and a third interface circuit in conformity with ULPI standards, the second interface circuit converting data transmitted from the first interface circuit and received and the third interface circuit transmitting the converted data;

a first circuit analyzing a packet output from the controller and identifying and holding a packet identifier contained in the packet; and a second circuit providing a transmission command, after which a data string containing a packet identifier indicating LPM (Link Power Management) bringing a USB device to a low power consumption state is added, if the first circuit determines that the packet identifier is the LPM.

2. The semiconductor device according to claim 1,
wherein the converting circuit is configured to convert the packet identifier to the transmission command, and to transmit a first transmission enable signal to the second circuit, and
wherein the controller is configured to output next data of the packet identifier in the data string when receiving a second transmission enable signal.

3. The semiconductor device according to claim 2,
wherein, if the first circuit determines that the packet identifier is the LPM, the second circuit is configured not to transmit the second transmission enable signal to the controller.

4. The semiconductor device according to claim 3,
wherein the second circuit is configured to assert the second transmission enable signal after 1 clock cycle from detection of assertion of the first transmission enable signal.

5. The semiconductor device according to claim 4,
wherein the converting circuit is configured to output the packet identifier indicating the LPM after the transmission command from the third interface circuit.

6. The semiconductor device according to claim 2,
wherein, if the first circuit determines that the packet identifier is not the LPM, the second circuit is configured to transmit the second transmission enable signal to the controller.

7. The semiconductor device according to claim 6,
wherein the second circuit is configured to assert the second transmission enable signal at the same clock as detection of assertion of the first transmission enable signal.

8. The semiconductor device according to claim 7,
wherein the converting circuit is configured to output data after the transmission command from the third interface circuit.

9. A USB system comprising:
a semiconductor device including:
a controller including a first interface circuit in conformity with UTMI+ standards;
a converting circuit including a second interface circuit in conformity with the UTMI+ standards and a third interface circuit in conformity with ULPI standards, the second interface circuit converting data transmitted from the first interface circuit and received, and the third interface circuit transmitting the converted data;
a first circuit analyzing a packet output from the controller and identifying and holding a packet identifier contained in the packet; and
a second circuit providing a transmission command, after which a data string containing the packet identifier indicating LPM (Link Power Management) bringing a USB device to a low power consumption state is added, if the first circuit determines that the packet identifier is the LPM;
a transceiver connected to the third interface circuit; and
the USB device connected to the transceiver.

10. A packet transmission method of a semiconductor device including: a controller including a first interface circuit in conformity with UTMI+ standards; and a converting circuit including a second interface circuit in conformity with the UTMI+ standards and a third interface circuit in conformity with ULPI standards, the second interface circuit converting data transmitted from the first interface circuit and received, the third interface circuit transmitting the converted data, a first circuit, and a second circuit, the method comprising the steps of:
analyzing, by the first circuit, a packet output from the controller;
identifying and holding, by the first circuit, a packet identifier contained in the packet; and
providing, by the second circuit, a transmission command based on the first circuit determining that the packet identifier is LPM (link Power Management) bringing a USB device to a lower power consumption state after a data string containing the packet identifier indicating the LPM is added.

* * * * *